US010604098B1

(12) United States Patent
Perez Lecuona et al.

(10) Patent No.: US 10,604,098 B1
(45) Date of Patent: Mar. 31, 2020

(54) PLASTIC COMPONENT FOR INTERIOR OF VEHICLE INCORPORATING SUPPORT ELEMENTS TO PREVENT VISIBLE DAMAGE ARISING FROM IMPACT FORCE

(71) Applicant: Ford Global Technologies, LLC, Dearborn, MI (US)

(72) Inventors: Carlos Perez Lecuona, Iztapalapa (MX); Diana Hernandez Cortes, Delegacion Azcapotzalco (MX); Federico Perez Lecuona, Iztapalapa (MX); Fernando Paisano Rodriguez, San Andres Cholula (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/156,318

(22) Filed: Oct. 10, 2018

(51) Int. Cl.
| | |
|---|---|
| *B60N 3/02* | (2006.01) |
| *B60N 3/10* | (2006.01) |
| *B60R 13/02* | (2006.01) |
| *B60R 21/04* | (2006.01) |
| *B60R 21/045* | (2006.01) |
| *B60R 7/04* | (2006.01) |

(52) U.S. Cl.
CPC ............. *B60R 21/04* (2013.01); *B60N 3/02* (2013.01); *B60N 3/10* (2013.01); *B60R 7/04* (2013.01); *B60R 13/0256* (2013.01); *B60R 21/045* (2013.01); *Y10T 428/15* (2015.01); *Y10T 428/249921* (2015.04)

(58) Field of Classification Search
CPC ....... B60R 21/04; B60R 13/0256; B60R 7/04; B60R 21/045; B60N 3/10; B60N 3/02; Y10T 428/15; Y10T 428/249921

USPC .......................................................... 428/33
See application file for complete search history.

(56) References Cited

U.S. PATENT DOCUMENTS

| | | | |
|---|---|---|---|
| 4,495,237 A | * | 1/1985 | Patterson .................. B32B 3/28 428/178 |
| 5,720,510 A | | 2/1998 | Daniel et al. |
| | | | (Continued) |

FOREIGN PATENT DOCUMENTS

| | | | | |
|---|---|---|---|---|
| JP | H08119047 A | | 5/1996 | |
| JP | 2003306110 A | * | 10/2003 | ............ B60J 5/0451 |
| JP | 2003306110 A | | 10/2003 | |

OTHER PUBLICATIONS

[NPL-1] Komatsu (JP 2003-306110 A); dated Oct. 28, 2003 (EPO—machine translation to English). (Year: 2003).*

*Primary Examiner* — David Sample
*Assistant Examiner* — Donald M Flores, Jr.
(74) *Attorney, Agent, or Firm* — David Coppiellie; Price Heneveld LLP

(57) ABSTRACT

A plastic component for an interior of a vehicle comprises: a first piece including a first support element; and a second piece facing the first piece and including a second support element adjacent to the first support element within an interstice between the first piece and the second piece; wherein, the first support element extends from an interstice-facing surface of the first piece at a junction, and the junction has a junction thickness that is less thick than a thickness of the first support element adjacent to the junction. During the transition from a non-impact position to an impact position, the junction can separate to induce breakage of the first piece in the interstice between the first piece and the second piece and not viewable from the interior of the vehicle.

20 Claims, 7 Drawing Sheets

(56) References Cited

U.S. PATENT DOCUMENTS

| | | | | |
|---|---|---|---|---|
| 5,826,907 | A | * | 10/1998 | Saito ................... B60R 13/0206 |
| | | | | 280/808 |
| 6,145,921 | A | | 11/2000 | Cho |
| 6,234,526 | B1 | * | 5/2001 | Song ....................... B60R 21/04 |
| | | | | 280/751 |
| 7,131,674 | B2 | * | 11/2006 | Evans ..................... B60R 19/18 |
| | | | | 293/120 |
| 2006/0145490 | A1 | * | 7/2006 | Yamaguchi ............. B60R 19/18 |
| | | | | 293/109 |
| 2007/0046010 | A1 | | 3/2007 | Haba et al. |
| 2010/0253114 | A1 | * | 10/2010 | Ohmiya .............. B60R 13/0225 |
| | | | | 296/187.05 |
| 2017/0015358 | A1 | * | 1/2017 | Jindal ................... B60R 21/045 |

\* cited by examiner

PLASTIC COMPONENT FOR INTERIOR OF VEHICLE INCORPORATING SUPPORT ELEMENTS TO PREVENT VISIBLE DAMAGE ARISING FROM IMPACT FORCE

FIELD OF THE INVENTION

The present invention generally relates to plastic components utilized in an interior of a vehicle.

BACKGROUND OF THE INVENTION

Plastic components are sometimes utilized in the interior of the vehicle. Robust plastic components may be desirable.

SUMMARY OF THE INVENTION

According to one aspect of the present invention, a plastic component for an interior of a vehicle comprises: a first piece including a first support element; and a second piece facing the first piece and including a second support element adjacent to the first support element within an interstice between the first piece and the second piece; wherein, the first support element extends from an interstice-facing surface of the first piece at a junction, and the junction has a junction thickness that is less thick than a thickness of the first support element adjacent to the junction.

Embodiments of the first aspect of the invention can include any one or a combination of the following features:
- the first piece further includes an exposed surface configured to be exposed within an interior of a vehicle;
- the first piece having a non-impact position where the first piece is not being forced toward the second piece, and an impact position where the first piece is being forced toward the second piece;
- during a transition from the non-impact position to the impact position, the junction separates;
- the second support element of the second piece includes a first cantilever portion extending toward the first piece from an interstice-facing surface of the second piece;
- during a transition from the non-impact position to the impact position, the first cantilever portion contacts the first support element of the first piece and flexes to impart resistance against the movement of the first piece;
- the second support element of the second piece includes a second cantilever portion extending toward the first piece from the interstice-facing surface of the second piece;
- during the transition from the non-impact position to the impact position, the second cantilever portion contacts the first support element of the first piece and flexes to impart resistance against the movement of the first piece;
- the first cantilever portion and the second cantilever portion of the second support element of the second piece are parallel when the first piece is in the non-impact position;
- the first cantilever portion and the second cantilever portion of the second support element flex in generally opposite directions as the first piece moves from the non-impact position to the impact position;
- when the force ceases forcing the first piece toward the second piece, the first cantilever portion returns to a non-flexed state and thereby pushes the first piece toward the non-impact position;
- when the force ceases forcing the first piece toward the second piece, the second cantilever portion returns to a non-flexed state and thereby pushes the first piece toward the non-impact position;
- the second support element of the second piece extends generally orthogonally from the interstice-facing surface of the second piece;
- the first support element includes a middle portion that is generally parallel to an interstice-facing surface of the first piece, and opposes a portion of the interstice-facing surface of the first support element;
- during the transition from the non-impact position to the impact position, the first cantilever portion contacts the middle portion of the first support element of the first piece and flexes to impart resistance against the movement of the first piece;
- when the first piece is in the non-impact position, the first cantilever portion of the second support element of the second piece is generally orthogonal to the middle portion of the first support element of the first piece;
- the first support element of the first piece further includes a first extension portion that extends from the interstice-facing surface of the first piece at the junction, a second extension portion that extends from the interstice-facing surface of the first piece at a second junction, and the middle portion that connects the first extension portion and the second extension portion;
- the first extension portion, the second extension portion, and the middle portion form a channel adjacent to the interstice-facing surface of the first piece;
- the second support element of the second piece is adjacent the middle portion of the first support element of the first piece;
- during the transition from the non-impact position to the impact position, the first cantilever portion and the second cantilever portion contact the middle portion of the first support element of the first piece and flexes to impart resistance against the movement of the first piece; and
- the first cantilever portion and the second cantilever portion of the second support element of the second piece are generally orthogonal to the middle portion of the first support element of the first piece, while the first piece is in the non-impact position.

According to a second aspect of the present invention, a plastic component for an interior of a vehicle comprises: a first piece opposing a second piece and forming an interstice therebetween; wherein, both the first piece and the second piece include a support element that cooperate within the interstice during a force forcing the first piece toward the second piece to provide flexural resistance to the force and to induce breakage of the first piece within the interstice.

Embodiments of the second aspect of the invention can include any one or a combination of the following features:
- the support element of the second piece includes a pair of cantilever portions that provide the flexural resistance to the force;
- the support element of the first piece includes: a first extension portion that extends from an interstice-facing surface of the first piece at a junction, the junction having a junction thickness that is less thick than a thickness of the first extension portion adjacent to the junction; a second extension portion that extends from the interstice-facing surface of the first piece at a second junction; and a middle portion that connects the first extension portion and the second extension portion;

the first extension portion, the second extension portion, and the middle portion form a channel adjacent to the interstice-facing surface of the first piece;

the breakage of the first piece is induced at the junction during application of the force;

the support element of the second piece including a pair of cantilever portions that provide the flexural resistance to the force by flexing against the middle portion of the support element of the first piece; and the middle portion of the support element of the first piece is generally orthogonal to the pair of cantilever portions of the second piece, before application of the force.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
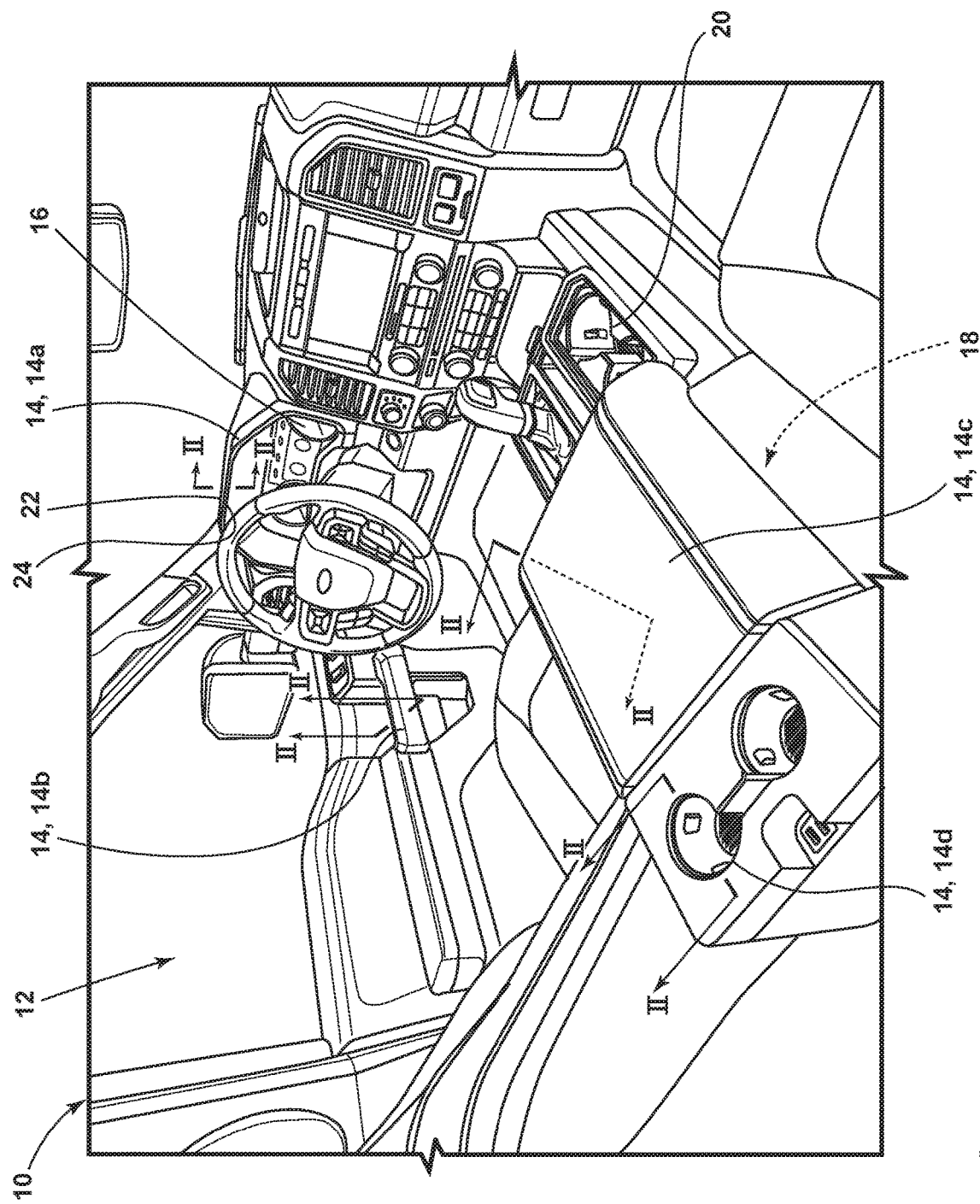
FIG. 1 is a perspective view of an interior of a vehicle, illustrating various plastic components having a first piece and a second piece, such as a dashboard overhang, a door handle, a center console lid, and a cup holder.

Referring to FIGS. 1A and 1B, a vehicle 10 includes an interior 12. Numerous plastic components 14 are disposed within the interior 12, such as a dashboard overhang 14a over an instrument panel 16, a door handle 14b, a lid 14c to cover selectively a storage area 18 of a center console 20, a cup holder 14d, among others. The interior 12 can include more, less, or different plastic components 14 than these mentioned examples 14a-14d, and the disclosed invention can apply to those plastic components 14a-14d. This disclosure provides the mentioned examples 14a-14d for illustrative purposes and not to limit the scope of any claim, unless the claim expressly limits the scope of the claim to a particular component. The vehicle 10 can be a car, truck, sports utility vehicle, van, and the like.

Figure 2:
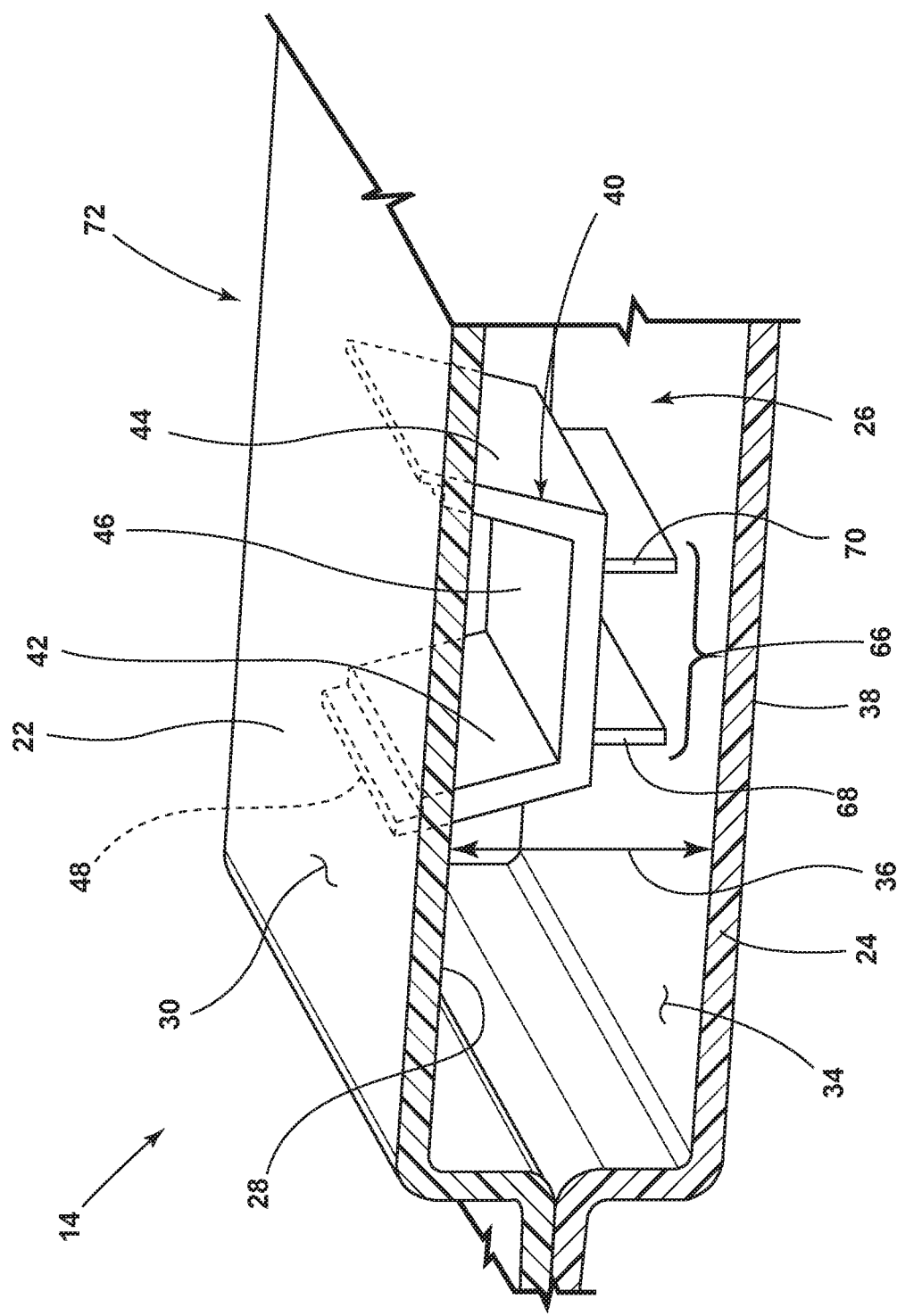
FIG. 2 is a schematic perspective cross-sectional view of any of the various plastic components of the interior of FIG. 1, illustrating a first piece over a second piece with an interstice between the two pieces, as well as a first support element extending from the first piece within the interstice, and a second support element extending from the second piece within the interstice.
Figure 3:
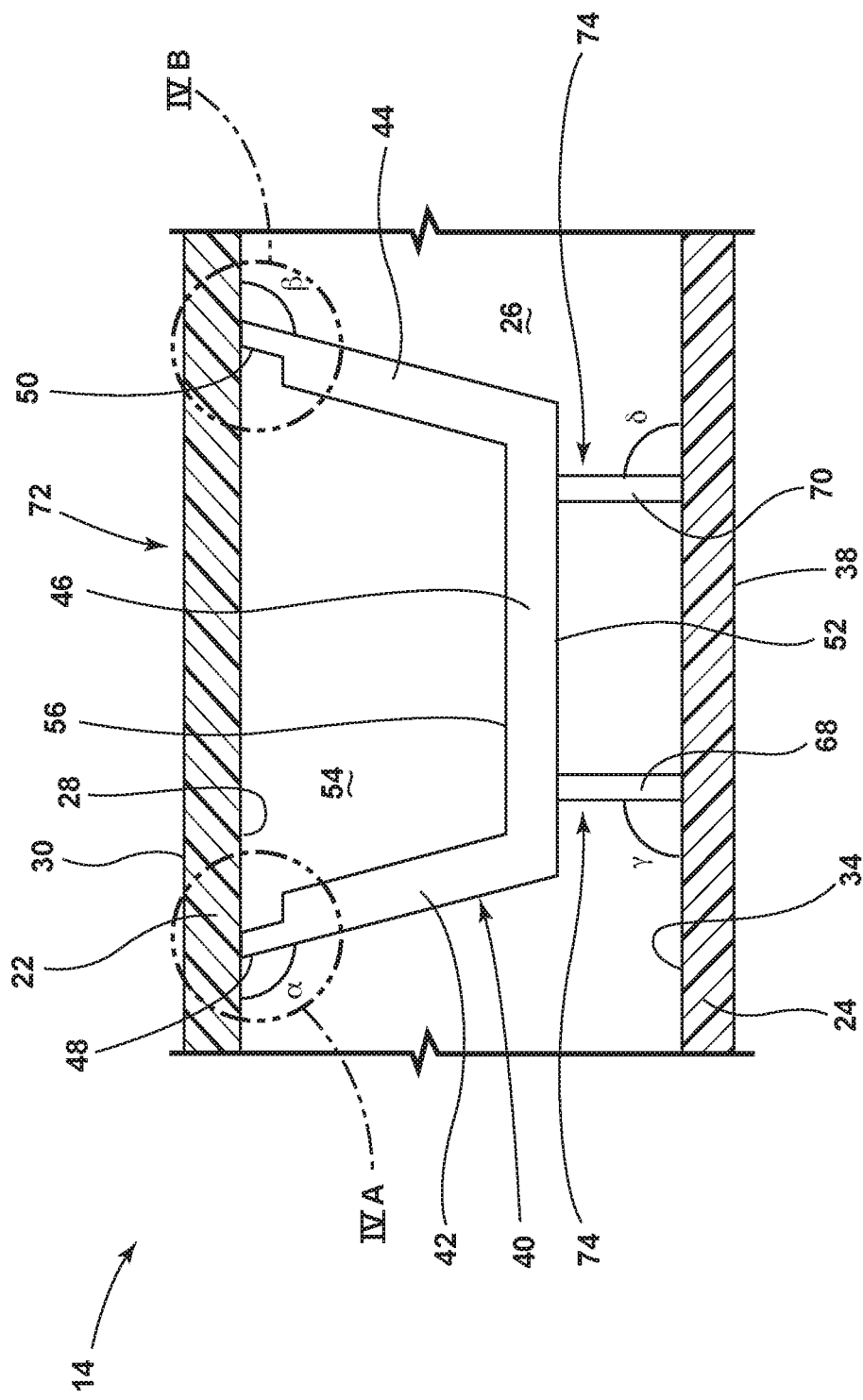
FIG. 3 is a schematic elevational cross-sectional view of any of the various plastic components of the interior of FIG. 1, illustrating the first support element extending from an interstice-facing surface of the first piece at a junction, and the second support element including a pair of cantilever portions extending from an interstice-facing surface of the second piece and terminating adjacent a middle portion of the first support element.

Referring now to FIGS. 2 and 3, the plastic component 14 includes a first piece 22 and a second piece 24. The first piece 22, the second piece 24, or both the first piece 22 and the second piece 24 can be molded plastic. In the illustrated embodiment, the first piece 22 is molded plastic and the second piece is molded plastic. The second piece 24 faces (opposes) the first piece 22 with an interstice 26 between the first piece 22 and the second piece 24. More specifically, the first piece 22 has an interstice-facing surface 28 and an exposed surface 30. The exposed surface 30 is configured to be, and is when assembled, exposed to receive a force 32 (described below) originating from within the interior 12 of the vehicle 10. In some embodiments, a user (not illustrated) can see and/or touch the exposed surface 30 when present within the interior 12 of the vehicle 10. Such an exposed surface 30 is sometimes referred to as an "A Class" surface or "Class-A" surface. However, the exposed surface 30 need not be visible or directly touchable, such as when covered by another material such as leather, cloth, or padding. The interstice-facing surface 28 is not similarly exposed and, in the illustrated embodiment, faces the opposite direction as the exposed surface 30. The interstice-facing surface 28 faces the interstice 26 between the first piece 22 and the second piece 24. The second piece 24 likewise includes an interstice-facing surface 34 that faces the interstice 26 and generally faces (opposes) the interstice-facing surface 28 of the first piece 22. In the illustrated embodiment, the interstice-facing surfaces 28, 34 of the first piece 22 and the second piece 24 respectively are planar and parallel but they need not be. The interstice 26 includes a distance 36 between the interstice-facing surfaces 28, 34. In the illustrated embodiment, the second piece 24 further includes a second surface 38, and the second surface 38 is exposed like the exposed surface 30 of the first piece 22. However, the second surface 38 need not be so exposed and can face another interstitial area (not illustrated).

The first piece 22 includes a first support element 40. In the illustrated embodiment, the first support element 40 is molded contiguously as part of the first piece 22. The first support element 40 is disposed within the interstice 26. The first support element 40 extends from the interstice-facing surface 28 of the first piece 22. More particularly, the first support element 40 includes a first extension portion 42, a second extension portion 44, and a middle portion 46, which are all contiguous. The first extension portion 42 extends from the interstice-facing surface 28 of the first piece 22 at a junction 48. The first extension portion 42 extends from the interstice-facing surface 28 at an angle α, which in the illustrated embodiment is an obtuse angle. The second extension portion 44 likewise extends from the interstice-facing surface 28 of the first piece 22 at a second junction 50. The second extension portion 44 extends from the interstice-facing surface 28 at an angle β, which in the illustrated embodiment is an obtuse angle and can be the same or approximately the same as angle α. The middle portion 46 connects the first extension portion 42 and the second extension portion 44. The middle portion 46 includes a surface 52 that faces (opposes) the interstice-facing surface 34 of the second piece 24. In the illustrated embodiment, the surface 52 of the middle portion 46 is generally parallel to the interstice-facing surface 34 of the second piece 24. The first extension portion 42, the second extension portion 44, and the middle portion 46 form a channel 54. The channel 54 is adjacent to and further bounded by the interstice-facing surface 28 of the first piece 22 generally facing the middle portion 46. More specifically, the middle portion 46 includes another surface 56 that is generally parallel to, and opposing, the portion of the interstice-facing surface 28 bounding the channel 54.

Figure 4B:
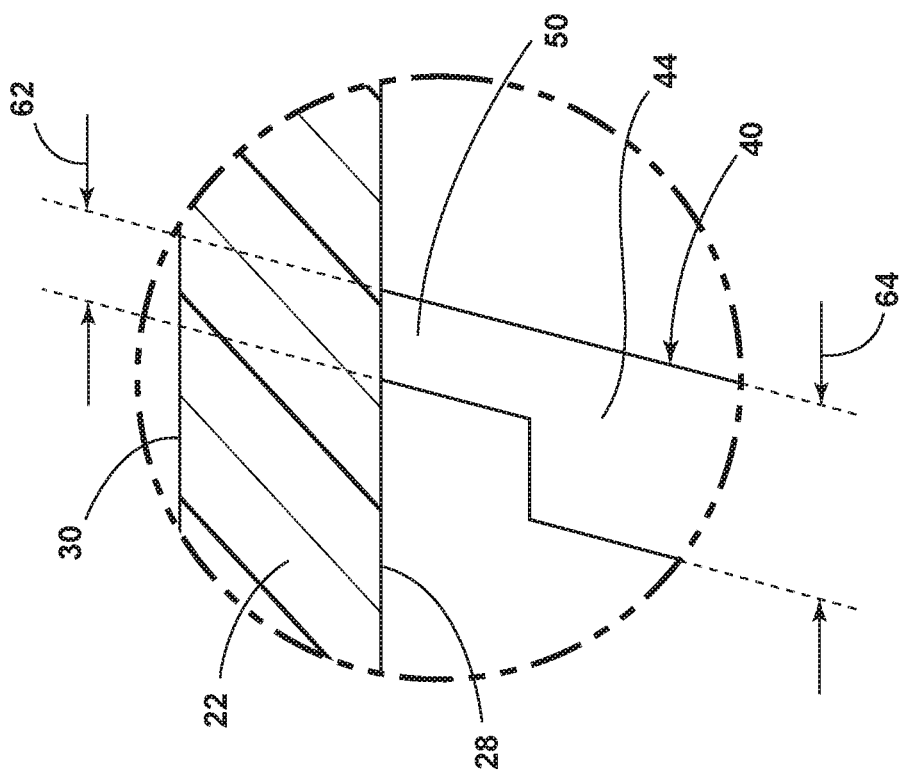
FIG. 4B is a close up view of area IVB of FIG. 3, illustrating a second junction having a junction thickness that is less thick than a thickness of the first support element (a second extension portion thereof) adjacent the second junction.
Figure 4A:
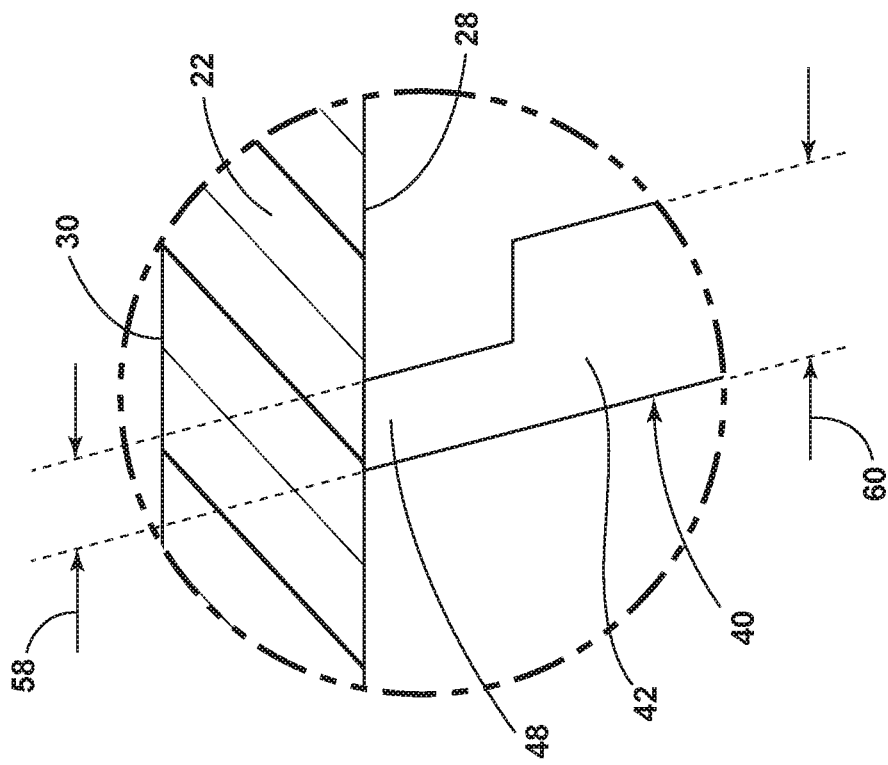
FIG. 4A is a close up view of area IVA of FIG. 3, illustrating the junction having a junction thickness that is less thick than a thickness of the first support element (a first extension portion thereof) adjacent the junction, the less thick thickness intended to induce breakage of the first piece upon application of a force upon the first piece, if such breakage were to occur, at the junction within the interstice and hidden from view from the interior.

Referring now additionally to FIGS. 4A and 4B, the junction 48 has a junction thickness 58, the first support element 40 adjacent to the junction 48 has a thickness 60, and the junction thickness 58 is less than the thickness 60. In other words, the first support element 40 is thinned-out at the junction 48. In the illustrated embodiment, the first support element 40 is likewise thinned-out at the second junction 50, with the second junction 50 having a junction thickness 62 that is less than a thickness 64 of the first support element 40 adjacent to the second junction 50. However, the junction thickness 62 of the second junction 50 need not be thinner than the thickness 64 of the first support element 40 adjacent to the second junction 50.

Referring back now to FIGS. 2 and 3, the second piece 24 of the plastic component 14 includes a second support element 66. In the illustrated embodiment, the second support element 66 is molded contiguously with the second piece 24. The second support element 66 is disposed in the interstice 26 between the first piece 22 and the second piece 24. The second support element 66 is adjacent the middle portion 46 of the first support element 40 of the first piece 22. The second support element 66 includes a first cantilever portion 68. The first cantilever portion 68 extends toward the first piece 22 from the interstice-facing surface 34 of the second piece 24. In the illustrated embodiment, the second support element 66 of the second piece 24 includes a second cantilever portion 70. However, the second piece 24 need not include the second cantilever portion 70. Like the first cantilever portion 68, the second cantilever portion 70 extends toward the first piece 22 from the interstice-facing surface 34 of the second piece 24. The first cantilever portion 68 extends at an angle γ, which in the illustrated embodiment is 90 degrees (orthogonally), from the interstice-facing surface 34. Likewise, the second cantilever portion 70 extends at an angle δ, which in the illustrated embodiment is 90 degrees (orthogonally), from the interstice-facing surface 34. However, angle γ and angle δ need not be 90 degrees.

Figure 7:
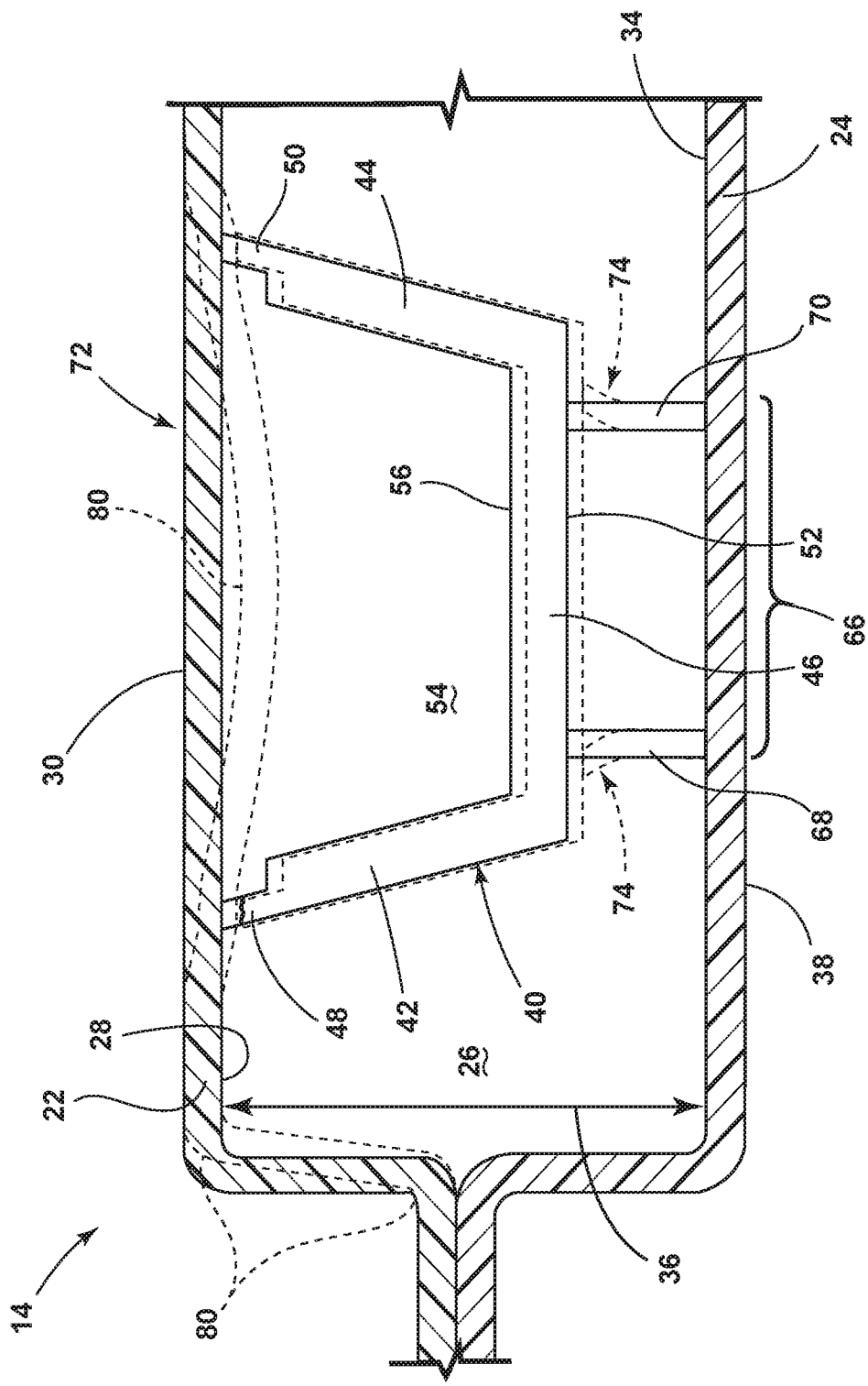
FIG. 7 is a schematic elevational cross-sectional view of any of the various plastic components of the interior of FIG. 1, illustrating the force having been removed and the first piece returning toward and to the non-impact position from the impact position with the aid of the first cantilever portion and the second cantilever portion extending from the second piece transition from the flexed state to a non-flexed state.

The first piece 22 has a non-impact position 72 (FIGS. 1-4B; see also FIG. 7). In the non-impact position 72, there is no force 32 (discussed below) forcing the first piece 22 toward the second piece 24. In the illustrated embodiment, while the first piece 22 is in the non-impact position 72, the first cantilever portion 68 and the second cantilever portion 70 of the second piece 24 are parallel. However, the first cantilever portion 68 and the second cantilever portion 70 of the second piece 24 need not be parallel. In addition, in the illustrated embodiment, while the first piece 22 is in the non-impact position 72 (i.e., before application of the force 32, discussed below), the first cantilever portion 68 and the second cantilever portion 70 of the second piece 24 are generally orthogonal to the surface 52 of the middle portion 46 of the first support element 40 of the first piece 22. Further, while the first piece 22 is in the non-impact position 72, the first cantilever portion 68 and the second cantilever portion 70 are in a non-flexed state 74. The first cantilever portion 68 and the second cantilever portion 70 may touch the middle portion 46 of the first support element 40 of the first piece 22, when the first piece 22 is in the non-impact position 72. Alternatively, the first cantilever portion 68 and the second cantilever portion 70 may be slightly separated from the surface 52 of the middle portion 46, when the first piece 22 is in the non-impact position 72.

Figure 5:
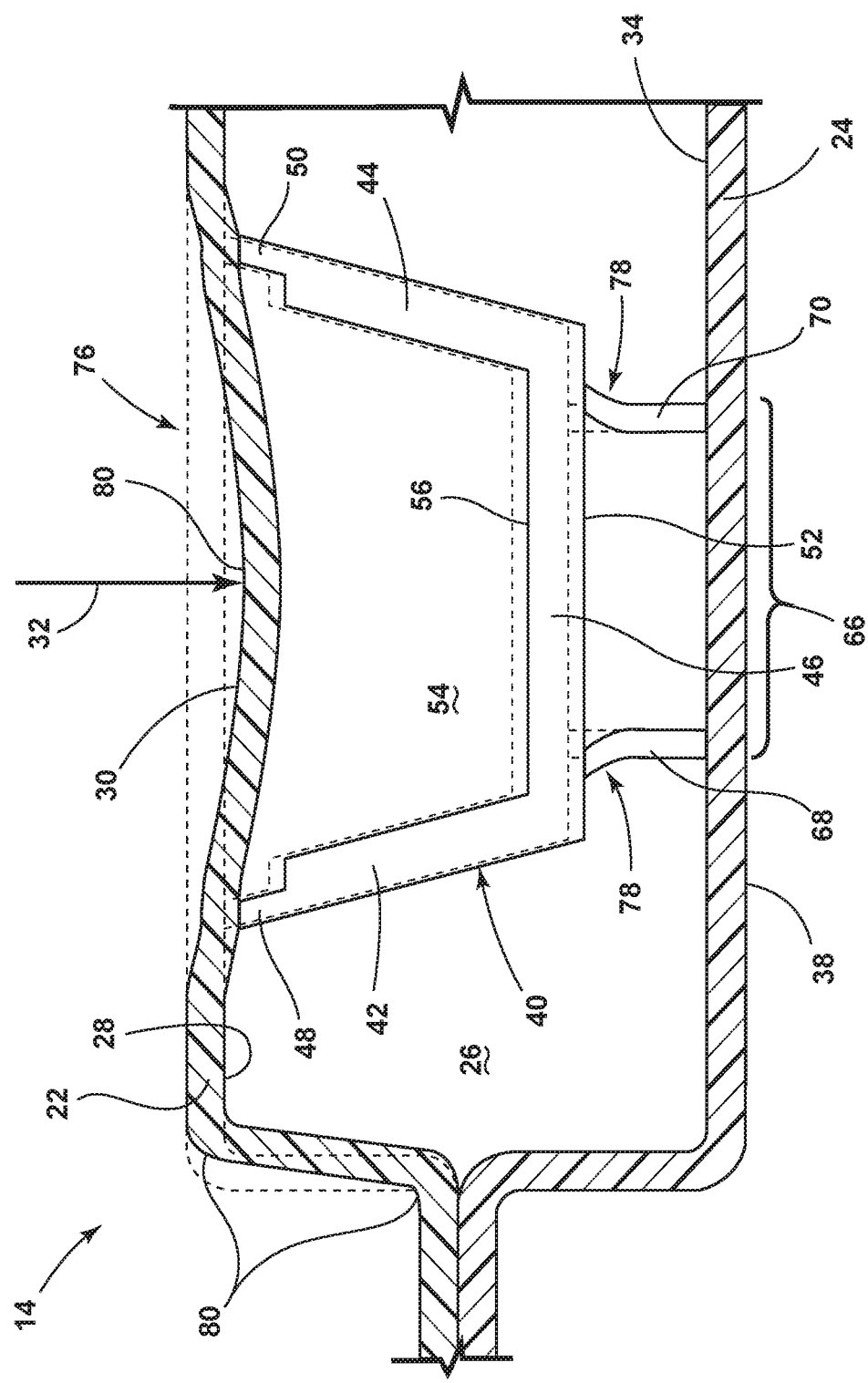
FIG. 5 is a schematic elevational cross-sectional view of any of the various plastic components of the interior of FIG. 1, just like FIG. 3, but illustrating a force forcing the first piece from a non-impact position (as in FIG. 3) to an impact position closer to the second piece, and the pair of cantilever portions of the second support element flexing against the first support element to a flexed state to provide flexural resistance to the first piece moving toward the second piece.

Referring now to FIG. 5, the first piece 22 has an impact position 76, where the force 32 is forcing the first piece 22 toward the second piece 24. The force 32 can be any force 32, such as an impact force. During the transition from the non-impact position 72 to the impact position 76, the first support element 40 and the second support element 66 cooperate within the interstice 26 to provide flexural resistance to the force 32. More specifically, during the transition from the non-impact position 72 to the impact position 76, the first cantilever portion 68 contacts the middle portion 46 of the first support element 40 of the first piece 22 and flexes to a flexed state 78. The flexing of the first cantilever portion 68 to the flexed state 78 against the middle portion 46 imparts flexural resistance against the movement of the first piece 22 toward the second piece 24. Likewise, during the transition from the non-impact position 72 to the impact position 76, the second cantilever portion 70, if included, contacts the middle portion 46 of the first support element 40 of the first piece 22 and flexes to the flexed state 78. The flexing of the second cantilever portion 70 against the middle portion 46 to the flexed state 78 imparts flexural resistance against the movement of the first piece 22 toward the second piece 24. In the illustrated embodiment, the pair of cantilever portions 68, 70 flex to the flexed state 78 in generally opposite directions, as the first piece 22 moves from the non-impact position 72 to the impact position 76. The flexural resistance against the movement of the first piece 22 toward the second piece 24 helps prevent the first piece 22 from cracking, breaking, or discoloring at various stress points 80 that might exist in the absence of the first support element 40 and the second support element 66. As mentioned, the first cantilever portion 68 alone could impart sufficient flexural resistance against the movement of the first piece 22 toward the second piece 24. In such an embodiment, the first cantilever portion 68 could be more centrally located adjacent the surface 52 of the middle portion 46 of the first support element 40.

Figure 6:
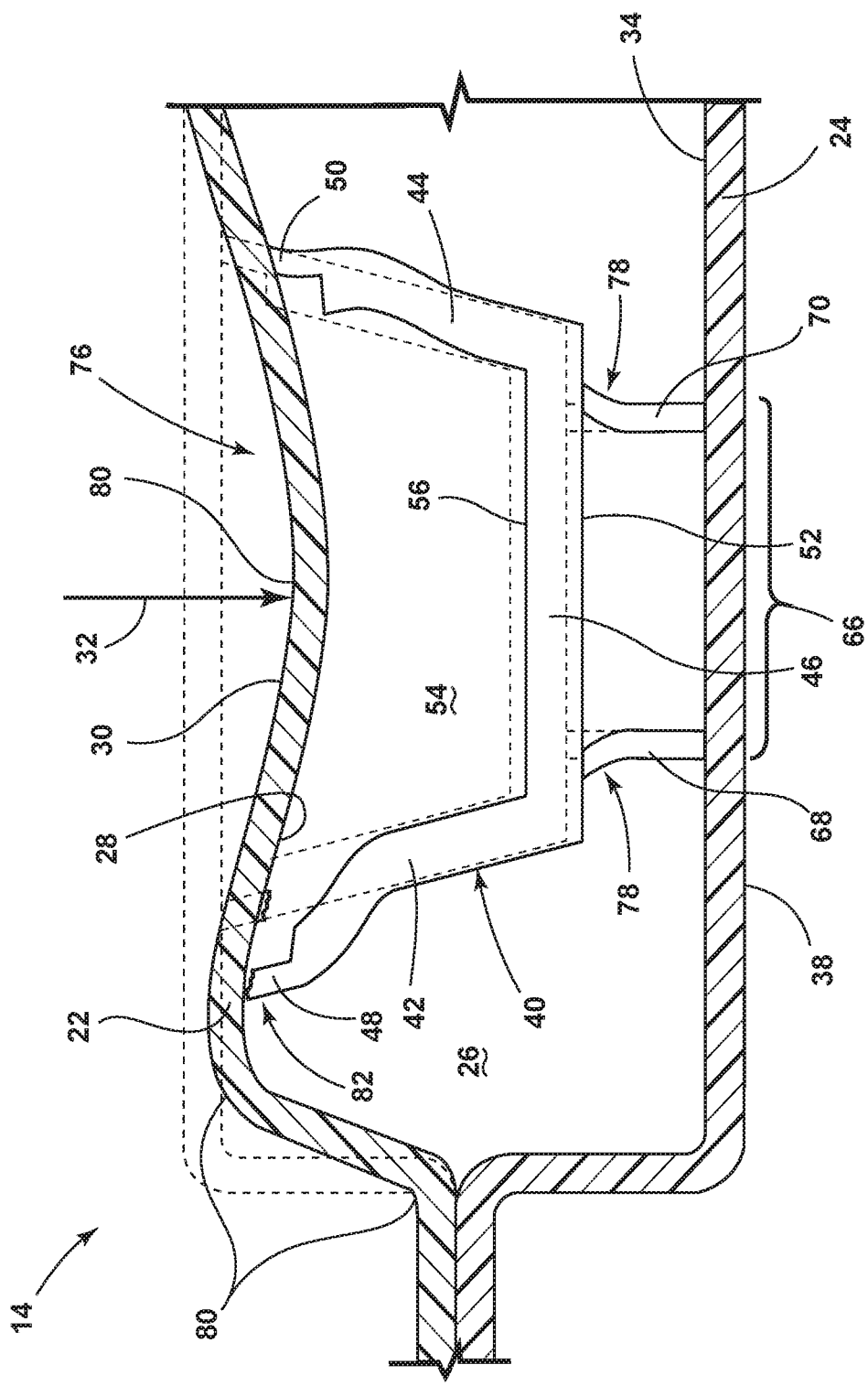
FIG. 6 is a schematic elevational cross-sectional view of any of the various plastic components of the interior of FIG. 1, again illustrating the force forcing the first piece from the non-impact position (as in FIG. 3) to the impact position closer to the second piece, and the first extension portion of the first support element breaking to a separated state at the junction within the interstice and hidden from view from the interior of the vehicle.

Referring now to FIG. 6, upon application of the force 32 of sufficient degree, during the transition of the first piece 22 from the non-impact position 72 to the impact position 76, the junction 48 between the first support element 40 and the interstice-facing surface 28 of the first piece 22 separates to a separated state 82. As mentioned, the junction 48 has a junction thickness 58 that is thinner than the thickness 60 of the first support element 40 adjacent the junction 48. In some embodiments, the junction thickness 58 is the thinnest part of the first piece 22. The thinned-out junction 48 induces breakage of the first piece 22 within the interstice 26. More specifically, the thinned-out junction 48 induces breakage of the first piece 22 at the junction 48 to the separated state 82 between the first support element 40 and the interstice-facing surface 28 during application of the force 32. Because the thinned-out junction 48 induces breakage within the interstice 26, the breakage of the first piece 22 does not occur at the various stress points 80 (FIG. 5). Because the thinned-out junction 48 induces breakage of the first piece 22 within the interstice 26, the breakage of the first piece 22 is hidden from the view of the user (not illustrated) in the interior 12 of the vehicle 10. In addition, because the second junction 50 can also have a relatively thin junction thickness 62 (see FIG. 4B), the second junction 50 can also induce breakage of the first piece 22 at the second junction 50 during application of the force 32. In any event, even after separation of the junction 48 and in the separated state 82, the first extension portion 42 of the first support element 40 flexes against the interstice-facing surface 28 of the first piece 22 and thereby provides flexural resistance against the first piece 22 moving toward the second piece 24. The flexural resistance that the first extension portion 42 imparts further prevents stress from occurring at the stress points 80 of the first piece 22. If the second junction 50 also separates, the second extension portion 44 can also flex against the interstice-facing surface 28 in the same manner.

Referring now to FIG. 7, when the force 32 expires and ceases forcing the first piece 22 to the impact position 76 toward the second piece 24, the first piece 22 returns toward the non-impact position 72. The first piece 22 can return to the non-impact position 72 or a position slightly varying from the non-impact position 72. Among other things, the first cantilever portion 68 and the second cantilever portion 70 return to the non-flexed state 74. The first cantilever portion 68 and the second cantilever portion 70 returning to the non-flexed state 74 pushes the first piece 22 toward and to the non-impact position 72.

The first support element 40 and the second support element 66 cooperate in the manner described above to improve the impact resistance of the first piece 22 and thus the plastic component 14 as a whole. Plastic components sometimes are tested for impact resistance. A plastic component failing the test can result to engineering changes late in the development process. Such changes are costly.

It is to be understood that variations and modifications can be made on the afore-mentioned structure without departure from the concepts of the present disclosure, and further it is to be understood that such concepts are intended to be covered by the following claims unless these claims by their language expressly state otherwise.

What is claimed is:

1. A plastic component for an interior of a vehicle comprising:
   a first piece comprising (i) an interstice-facing surface, (ii) a first extension portion that extends from the interstice-facing surface at a junction that has a junction thickness that is less thick than a thickness of the first extension portion adjacent to the junction, (iii) a second extension portion that extends from the interstice-facing surface at a second junction, and (iv) a middle portion that connects the first extension portion and the second extension portion, wherein the first extension portion, the second extension portion, and the middle portion form a channel further bounded by the interstice-facing surface facing the middle portion;
   a second piece facing the first piece, the second piece comprising (i) an interstice-facing surface, and (ii) a first cantilever portion extending from the interstice-facing surface toward the middle portion of the first piece; and
   an interstice separating the first piece and the second piece;
   wherein, the first piece has a non-impact position where the first piece is not being forced toward the second piece, and an impact position where an impact force forces the first piece toward the second piece; and
   wherein, during a transition from the non-impact position to the impact position, the first cantilever portion of the second piece contacts the middle portion of the first piece and flexes to resist movement of the first piece.

2. The plastic component of claim 1,
   wherein, the first piece further includes an exposed surface configured to be exposed within an interior of a vehicle.

3. The plastic component of claim 1,
   wherein, during a transition from the non-impact position to the impact position, the junction separates.

4. The plastic component of claim 1,
   wherein, the second piece further comprises a second cantilever portion extending toward the middle portion of the first piece from the interstice-facing surface of the second piece; and
   wherein, during the transition from the non-impact position to the impact position, the second cantilever portion contacts the middle portion of the first piece and flexes to resist the movement of the first piece.

5. The plastic component of claim 4,
   wherein, the first cantilever portion and the second cantilever portion of the second piece are parallel when the first piece is in the non-impact position.

6. The plastic component of claim 4,
   wherein, the first cantilever portion and the second cantilever portion of the second piece flex in generally opposite directions as the first piece moves from the non-impact position to the impact position.

7. The plastic component of claim 4,
   wherein, the first cantilever portion and the second cantilever portion of the second piece are generally orthogonal to the middle portion of the first piece, while the first piece is in the non-impact position.

8. The plastic component of claim 1,
   wherein, when the force ceases forcing the first piece toward the second piece, the first cantilever portion returns to a non-flexed state and thereby pushes the first piece toward the non-impact position.

9. The plastic component of claim 8,
wherein, the second piece further comprises a second cantilever portion extending toward the middle portion of the first piece from the interstice-facing surface of the second piece;
wherein, during the transition from the non-impact position to the impact position, the second cantilever portion contacts the middle portion of the first piece and flexes to resist the movement of the first piece; and
wherein, when the force ceases forcing the first piece toward the second piece, the second cantilever portion returns to a non-flexed state and thereby pushes the first piece toward the non-impact position.

10. The plastic component of claim 1,
wherein, the first cantilever portion of the second piece extends generally orthogonally from the interstice-facing surface of the second piece.

11. The plastic component of claim 1,
wherein, the middle portion of the first piece is generally parallel to the interstice-facing surface of the second piece, and opposes a portion of the interstice-facing surface of the first piece.

12. The plastic component of claim 1,
wherein, the second junction has a junction thickness that is less than a thickness of the second extension portion adjacent to the second junction.

13. The plastic component of claim 1,
wherein, when the first piece is in the non-impact position, the first cantilever portion of the second piece is generally orthogonal to the middle portion of the first piece.

14. The plastic component of claim 1,
wherein, the middle portion of the first piece comprises (i) a surface that faces and is generally parallel to the interstice-facing surface of the first piece, and (ii) another surface that faces and is generally parallel to the interstice-facing surface of the second piece.

15. The plastic component of claim 1,
wherein, after the junction separates, and while the first piece is in the impact position, the first extension portion flexes against the interstice-facing surface of the first piece and thereby resists the movement of the first piece toward the second piece.

16. A plastic component for an interior of a vehicle comprising:
a first piece opposing a second piece and forming an interstice therebetween;
wherein, both the first piece and the second piece comprise a support element that cooperate within the interstice during a force forcing the first piece toward the second piece to provide flexural resistance to the force;
wherein, the support element of the first piece comprises (i) an interstice-facing surface that faces the interstice, (ii) a first extension portion that extends from the interstice-facing surface toward the second piece at a junction, the junction having a thickness that is less than a thickness of the first extension portion adjacent to the junction, (iii) a second extension portion that extends from the interstice-facing surface toward the second piece, and (iv) a middle portion that connects the first extension portion and the second extension portion, wherein the interstice-facing surface, the first extension portion, the second extension portion, and the middle portion form a channel; and
wherein, the support element of the second piece comprises a pair of cantilever portions that provide the flexural resistance to the force by flexing against the middle portion of the support element of the first piece.

17. The plastic component of claim 16,
wherein, the second piece further comprises an interstice-facing surface that faces the interstice; and
wherein, the pair of cantilever portions of the second piece extend generally orthogonally from the interstice-facing surface toward the support element of the first piece.

18. The plastic component of claim 16,
wherein, a breakage of the first piece is induced at the junction during application of the force.

19. The plastic component of claim 18,
wherein, after the first piece breaks at the junction, and during application of the force, the first extension portion flexes against the interstice-facing surface of the first piece and thereby resists movement of the first piece toward the second piece.

20. The plastic component of claim 16,
wherein, the middle portion of the support element of the first piece is generally orthogonal to the pair of cantilever portions of the second piece, before application of the force.

* * * * *